United States Patent
Cheong et al.

(10) Patent No.: US 10,666,985 B1
(45) Date of Patent: May 26, 2020

(54) SUB-BLOCK BASED ENTROPY CODING FOR IMAGE CODING

(71) Applicant: Sony Corporation, Tokyo (JP)

(72) Inventors: Hye-Yeon Cheong, Los Gatos, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/194,357

(22) Filed: Nov. 18, 2018

(51) Int. Cl.
*H04N 19/176* (2014.01)
*H04N 19/91* (2014.01)
*H04N 19/119* (2014.01)

(52) U.S. Cl.
CPC ........... *H04N 19/91* (2014.11); *H04N 19/119* (2014.11); *H04N 19/176* (2014.11)

(58) Field of Classification Search
CPC ............................ H04N 19/13; H04N 19/176
See application file for complete search history.

(56) References Cited

U.S. PATENT DOCUMENTS

| | | | | |
|---|---|---|---|---|
| 5,717,393 A * | 2/1998 | Nakano | .................. | G06T 9/005 341/106 |
| 6,879,268 B2 | 4/2005 | Karczewicz | | |
| 7,305,035 B2 * | 12/2007 | Kondo | .................. | H03M 7/40 375/240.23 |
| 8,483,282 B2 | 7/2013 | Karczewicz et al. | | |
| 10,390,044 B2 * | 8/2019 | Karczewicz | .......... | H04N 19/96 |
| 2003/0214422 A1 * | 11/2003 | Saunders | ............. | H04N 19/176 341/51 |
| 2004/0184538 A1 * | 9/2004 | Abe | ........................ | G06T 9/004 375/240.12 |
| 2007/0242890 A1 * | 10/2007 | Wen | ..................... | H04N 19/176 382/233 |
| 2011/0051811 A1 * | 3/2011 | Wang | ..................... | H04N 19/50 375/240.12 |
| 2011/0142133 A1 * | 6/2011 | Takahashi | ............. | H04N 19/184 375/240.16 |
| 2011/0248873 A1 * | 10/2011 | Karczewicz | ........... | H03M 7/46 341/67 |
| 2016/0277738 A1 * | 9/2016 | Puri | ....................... | H04N 19/61 |
| 2018/0103261 A1 * | 4/2018 | Sun | ...................... | H04N 19/124 |

FOREIGN PATENT DOCUMENTS

EP 0128764 A1 * 12/1984 ............. H03M 7/42

OTHER PUBLICATIONS

S.V.Bharath Kumar et al., "Block-based conditional entropy coding for medical image compression", GE Global Research, John F. Welch Technology Centerk, Bangalore, India., GE Medical Systems, IIS-Engineering, Mt. Prospect, Illinois, USA.

* cited by examiner

*Primary Examiner* — Jamie J Atala
*Assistant Examiner* — Michael Robert Cammarata
(74) *Attorney, Agent, or Firm* — Haverstock & Owens LLP

(57) ABSTRACT

A sub-block entropy coding method more efficiently encodes content. Specifically, by selecting the most optimal tables for each sub-block, the number of bits utilizes is minimized. Furthermore, based on results, tables are able to be eliminated as options to further reduce the number of signaling bits.

15 Claims, 8 Drawing Sheets

| Entropy Coding Tables | Sub-block PCM (200) | | Sub-block PCM Extension (sub-block entropy) (202) | |
|---|---|---|---|---|
| | Y | UV | Y | UV |
| A | A110 coding | A110 coding | A110 coding | A110 coding |
| B | ECX | EC1 | EC0 | EC0 |
| C | PCM | ECX | ECX | EC2 |
| D | . | . | PCM | EC1 |
| # of entropy coding tables | 3 (A,B,C) | | 4 (A,B,C, D) | |
| # of supported combinations | 5 AA, BB, CC, AC, BC | | Maximum 10. (can be reduced) | |

| Entropy Coding Tables | Sub-block PCM | | Sub-block PCM Extension (sub-block entropy) | |
|---|---|---|---|---|
| | Y | UV | Y | UV |
| A | A110 coding | A110 coding | A110 coding | A110 coding |
| B | ECX | EC1 | EC0 | EC0 |
| C | PCM | ECX | ECX | EC2 |
| D | . | . | PCM | EC1 |
| # of entropy coding tables | 3 (A,B,C) | | 4 (A,B,C, D) | |
| # of supported combinations | 5<br>AA, BB, CC, AC, BC | | Maximum 10. (can be reduced) | |

| input | VLC length | code word |
|---|---|---|
| 0 | 1 | 1 |
| -1 | 3 | 010 |
| 1 | 3 | 011 |
| -2 | 4 | 0010 |
| 2 | 4 | 0011 |
| -3 | 5 | 00010 |
| 3 | 5 | 00011 |
| -4 | 6 | 000010 |
| 4 | 6 | 000011 |
| -5 | 7 | 0000010 |
| 5 | 7 | 0000011 |
| -6 | 8 | 00000010 |
| 6 | 8 | 00000011 |
| -7 | 9 | 000000010 |
| 7 | 9 | 000000011 |
| -8 | 10 | 0000000010 |
| 8 | 10 | 0000000011 |
| -9 | 11 | 00000000010 |
| 9 | 11 | 00000000011 |
| -10 | 12 | 000000000010 |
| 10 | 12 | 000000000011 |
| -11 | 13 | 0000000000010 |
| 11 | 13 | 0000000000011 |
| -12 | 14 | 00000000000010 |
| 12 | 14 | 00000000000011 |
| -13 | 15 | 000000000000010 |
| 13 | 15 | 000000000000011 |
| -14 | 15 | 000000000000000 |
| 14 | 15 | 000000000000001 |

ECX

| input | VLC length | code word |
|---|---|---|
| 0 | 2 | 11 |
| . | . | . |
| . | . | . |
| . | . | . |
| x | y | z |

EC0

| input | VLC length | code word |
|---|---|---|
| 0 | 1 | 1 |
| -1 | 2 | 00 |
| 1 | 2 | 01 |

EC2

| input | VLC length | code word |
|---|---|---|
| 0 | 2 | 00 |
| -1 | 2 | 10 |
| 1 | 2 | 11 |
| -2 | 3 | 010 |
| 2 | 3 | 011 |

Fig. 3

| Implementation | | Y | | UV | |
|---|---|---|---|---|---|
| | | type | How to compute # of coding bits | type | How to compute # of coding bits |
| STEP 1 Compute # of bits used for coding each quantized sub-block | Bits#A (NX1 vector) | ALL0 | 0, if all residuals are 0 Inf, otherwise | ALL0 | 0, if all residuals are 0 Inf, otherwise |
| | Bits#B (NX1 vector) | EC0 | Based on EC0 VLC table | EC0 | Based on EC0 VLC table |
| | Bits#C (NX1 vector) | ECX | Based on ECX VLC table | EC2 | Based on EC2 VLC table |
| | Bits#D (NX1 vector) | PCM | Fixed constant = (depth − qn) × # of samples | EC1 | Based on EC1 VLC table |
| Implementation | | Computing cost of each combination | | Corresponding sub-block POS signal | |
| STEP 2 Compute & compare costs of all combinations. Pick the minimum cost. | | Cost(AA) = sum(Bits#A) | | . | |
| | | Cost(BB) = sum(Bits#B) | | . | |
| | | Cost(CC) = sum(Bits#C) | | . | |
| | | Cost(DD) = sum(Bits#D) | | . | |
| | | Cost(AB) = sum(min(Bits#A, Bits#B)) + N | | Bits#A > Bits#B | |
| | | Cost(AC) = sum(min(Bits#A, Bits#C)) + N | | Bits#A > Bits#C | |
| | | Cost(AD) = sum(min(Bits#A, Bits#D)) + N | | Bits#A > Bits#D | |
| | | Cost(BC) = sum(min(Bits#B, Bits#C)) + N | | Bits#B > Bits#C | |
| | | Cost(BD) = sum(min(Bits#B, Bits#D)) + N | | Bits#B > Bits#D | |
| | | Cost(CD) = sum(min(Bits#C, Bits#D)) + N | | Bits#C > Bits#D | |

Fig. 4

SUB-BLOCK BASED ENTROPY CODING FOR IMAGE CODING

FIELD OF THE INVENTION

The present invention relates to video coding. More specifically, the present invention relates to image/video compression.

BACKGROUND OF THE INVENTION

Video coding includes quantization, Differential Pulse-Code Modulation (DPCM), entropy coding and refinement. Entropy coding is a lossless data compression scheme which compresses data by replacing each fixed-length input symbol with the corresponding variable-length prefix-free output codeword.

SUMMARY OF THE INVENTION

A sub-block entropy coding method more efficiently encodes content. Specifically, by selecting the most optimal tables for each sub-block, the number of bits utilizes is minimized. Furthermore, based on results, tables are able to be eliminated as options to further reduce the number of signaling bits.

In one aspect, a method programmed in a non-transitory memory of a device comprises partitioning a block of an image into one or more sub-blocks, choosing at least one entropy coding table from a plurality of entropy coding tables and utilizing the at least one entropy coding table to perform entropy coding. The method further comprises selecting the plurality of entropy coding tables. Choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding. Choosing the combination of two entropy coding tables includes signaling per block. When the entropy coding tables in the combination of two entropy coding tables are different, then a 1-bit signal per sub-block is used. The plurality of entropy coding tables is reduced by one or more entropy coding tables based on statistical analysis. Choosing the at least one entropy coding table from the plurality of entropy coding tables is based on determining a minimum number of bits for coding the sub-block.

In another aspect, an apparatus comprises a non-transitory memory for storing an application, the application for: partitioning a block of an image into one or more sub-blocks, choosing at least one entropy coding table from a plurality of entropy coding tables and utilizing the at least one entropy coding table to perform entropy coding and a processor coupled to the memory, the processor configured for processing the application. The application is further for selecting the plurality of entropy coding tables. Choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding. Choosing the combination of two entropy coding tables includes signaling per block. When the entropy coding tables in the combination of two entropy coding tables are different, then a 1-bit signal per sub-block is used. The plurality of entropy coding tables is reduced by one or more entropy coding tables based on statistical analysis. Choosing the at least one entropy coding table from the plurality of entropy coding tables is based on determining a minimum number of bits for coding the sub-block.

In another aspect, a system comprises a first computing device configured for: partitioning a block of an image into one or more sub-blocks, choosing at least one entropy coding table from a plurality of entropy coding tables and utilizing the at least one entropy coding table to perform entropy coding to encode content and a second computing device configured for: decoding the encoded content. The first computing device is further for selecting the plurality of entropy coding tables. Choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding. Choosing the combination of two entropy coding tables includes signaling per block. When the entropy coding tables in the combination of two entropy coding tables are different, then a 1-bit signal per sub-block is used. The plurality of entropy coding tables is reduced by one or more entropy coding tables based on statistical analysis. Choosing the at least one entropy coding table from the plurality of entropy coding tables is based on determining a minimum number of bits for coding the sub-block.

BRIEF DESCRIPTION OF THE DRAWINGS

FIG. 2 illustrates a diagram of a comparison of sub-block Pulse Code Modulation (PCM) versus sub-block based entropy coding according to some embodiments.

FIG. 3 illustrates a diagram of Variable-Length Code (VLC) tables according to some embodiments.

FIG. 4 illustrates a diagram of an implementation of the sub-block based entropy coding method according to some embodiments.

DETAILED DESCRIPTION OF THE PREFERRED EMBODIMENT

To improve a coder/decoder ("codec"), entropy coding is optimized by utilizing sub-block entropy coding. Entropy coding is binarization utilized to compress data, and the compression is able to be performed block by block. For example, a 16×2 image block is encoded such that the result includes header bits, entropy coded bits and refinement bits.

As is known for codecs, an encoder performs prediction, transform and encoding steps to generate a compressed bitstream, and a decoder implements decoding, inverse transform and reconstruction to generate a decoded video (or other content). During prediction, the encoder processes a frame of a video (a macroblock), to generate a prediction of the macroblock based on previously coded data.

Figure 1:
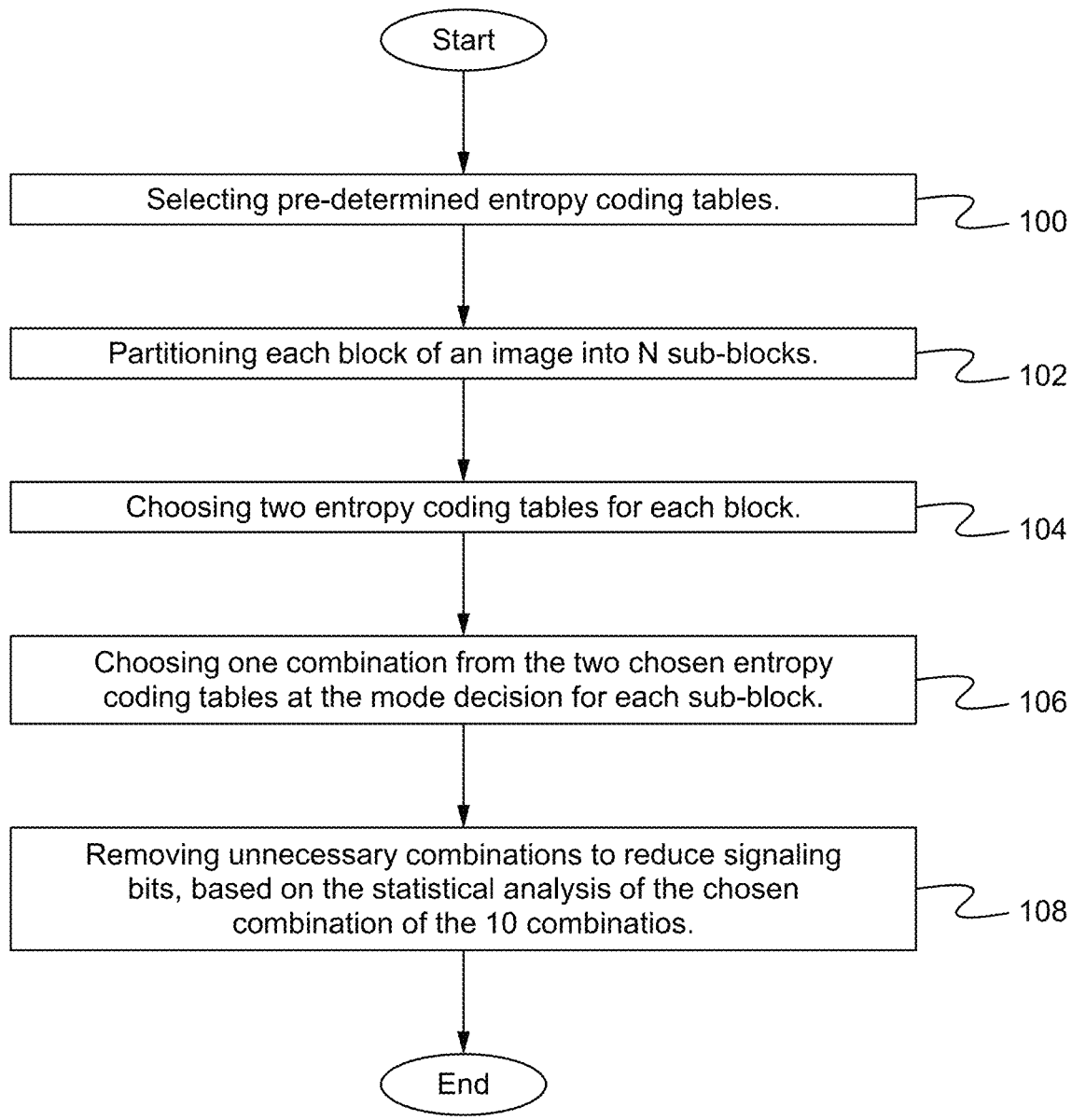
FIG. 1 illustrates a flowchart of a method of implementing sub-block entropy coding according to some embodiments.

FIG. 1 illustrates a flowchart of a method of implementing sub-block entropy coding according to some embodiments.

In the step 100, pre-determined entropy coding tables are selected. For example, 4 entropy coding tables (A, B, C and D) are selected. Although 4 tables are mentioned, any number of entropy coding tables are able to be offered/selected, and any entropy coding tables are able to be utilized. In the step 102, each block of an image is partitioned into N sub-blocks, where N is able to be any number from 1 (entire image or block) to a number of sub-blocks each with a minimum size. In the step 104, each block is able to choose two entropy coding tables from A, B, C and D at the mode decision. Thus, out of 4 tables, there are able to be 10 combinations: AA, AB, AC, AD, BB, BC, BD, CC, CD, DD. Selecting the two entropy coding tables includes signaling per block or sub-block (e.g., 3 or 4 bits). In the step 106, each sub-block chooses one combination from the two chosen entropy coding tables at the mode decision. If the two tables selected are AB, AC, AD, BC, BD or CD (in other words, where the tables are different), then a 1 bit signal per sub-block is used (POSition (POS) signal: N bits). If the two tables selected are AA, BB, CC, DD (in other words, the tables are the same), then no signaling is used (POS signal: 0 bits). In some embodiments, a table is selected for the chroma and luma, separately. FIG. 4 describes how the tables are selected (e.g., based on minimum bits/cost). In the step 108, based on the statistical analysis of the chosen combination of the 10 combinations, unnecessary combinations are removed to reduce signaling bits. For example, if it is determined that CD is never chosen (or below a threshold) after a statistically significant (e.g., 100, 1000 or 1 million) amount of tests or runs, then CD is removed as a possible combination, and the signaling bits are modified to account for fewer possible combinations. In some embodiments, the 10 possible combinations (or other number) is reduced to 8 combinations by removing 2 possible combinations so that 3-bit signaling per block is able to be implemented (e.g., 000 to 111). In another example, the highest top 8 combinations are retained, and the others are dropped. In some embodiments, fewer or additional steps are implemented. For example, a decoder decodes the entropy coded content. In some embodiments, the order of the steps is modified.

In an exemplary implementation, an image is partitioned into one or more blocks. Each block of the image is partitioned into one or more sub-blocks. Each block (or sub-block) chooses two entropy coding tables (e.g., from A, B, C, D). In some embodiments, choosing the two entropy coding tables is based on determining a minimum number of bits used for coding each sub-block. For example, the number of bits for entropy coding is computed for all of the entropy coding tables, but the two with the minimum cost are selected. Furthering the example, the Allzero table is chosen for luma, and the EC2 table is chosen for chroma because they have the minimum cost.

FIG. 2 illustrates a diagram of a comparison of sub-block Pulse Code Modulation (PCM) versus sub-block based entropy coding according to some embodiments. As is shown, sub-block PCM 200 uses three entropy coding tables (A, B, C), and sub-block entropy coding 202 uses four entropy coding tables (A, B, C, D). The entropy coding tables are shown in further detail in FIG. 3.

For sub-block PCM 200, for entropy coding table A, All0 (Allzero) coding is used for Y (luma) and UV (chroma), which means the codeword is always zero (0). For entropy coding table B, the ECX table is used for Y, and EC1 is used for UV. For entropy coding table C, PCM is used for Y, and ECX is used for UV. There is no entropy coding table D in sub-block PCM 200.

For sub-block entropy coding 202, for entropy coding table A, All0 (Allzero) coding is used for Y and UV, which means the codeword is always zero (0). For entropy coding table B, the EC0 table is used for Y, and EC2 is used for UV. For entropy coding table C, ECX is used for Y, and EC2 is used for UV. For entropy coding table C, PCM is used for Y, and EC1 is used for UV.

FIG. 3 illustrates a diagram of VLC tables according to some embodiments. Among the VLC tables are: EC1, EC0, EC2 and ECX. Although these tables are shown, any other table is able to be utilized.

FIG. 4 illustrates a diagram of an implementation of the sub-block based entropy coding method according to some embodiments. In the step 400, the number of bits used for coding each quantized sub-block is computed. For example, for Y, for the Allzero table, if the sub-block is 0, then all residuals are 0, otherwise, it is infinite (e.g., not used). For the EC0 and ECX tables, the number of coding bits is based on the respective table. For PCM, there is a fixed constant. Similar computations are performed for UV, in the tables Allzero, EC0, EC2 and EC1.

In the step 402, the total number of bits (e.g., cost) for the sub-block are computed and compared for all of the combinations, and the combination with the minimum cost is selected. For example, if the total cost of AA is less than the total cost of the other table combinations, then AA is selected. In another example, when the same table is used for Y and UV, the cost is the sum of the bits for those tables, and when different tables are used for Y and UV, then the cost is the sum of the tables with the lowest minimums plus N, the length of the vector of the sub-block. Furthering the example, it is determined if all residuals are 0 in a Y sub-block, and if they are, then the Allzero table (or Table A) is used for Y, and assuming in this example, for UV, the EC0 table uses the fewest bits, then EC0 table (or Table C) is used for UV. The total cost in this example is the Allzero cost plus the EC0 table cost plus N. When the table combination uses two different tables (e.g., AC), then N (the length of the vector of the sub-block) is added to the total cost. Although 4 tables are described herein, X tables (where X is any number) are able to be used.

Figure 5:
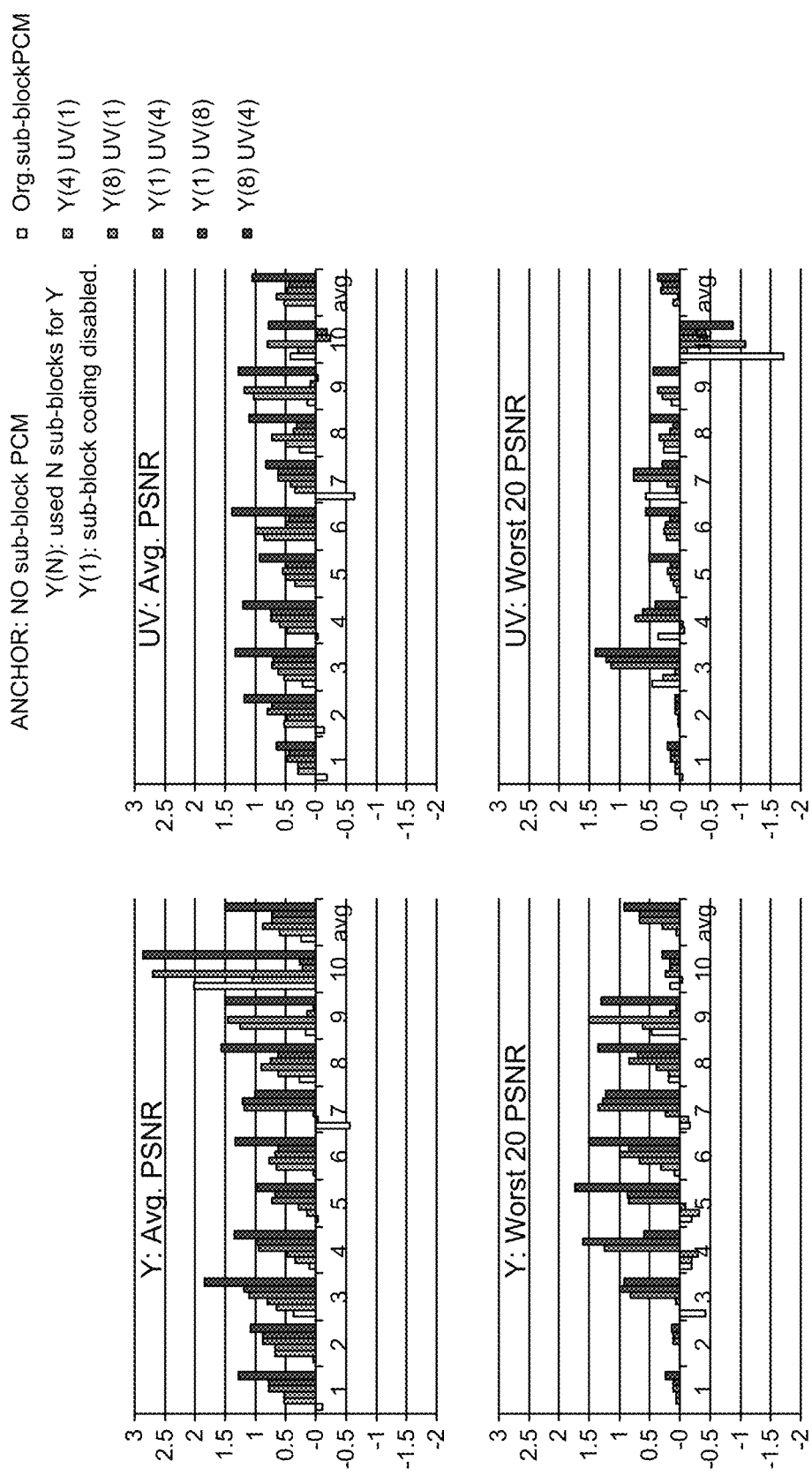
FIG. 5 illustrates charts of test results according to some embodiments.

FIG. 5 illustrates charts of test results according to some embodiments. As shown, original sub-block PCM implementation generally performs worse than any of the sub-block entropy coding implementations in terms of average Peak Signal-to-Noise Ratio (PSNR) and based on the worst 20 PSNR.

Figure 6:
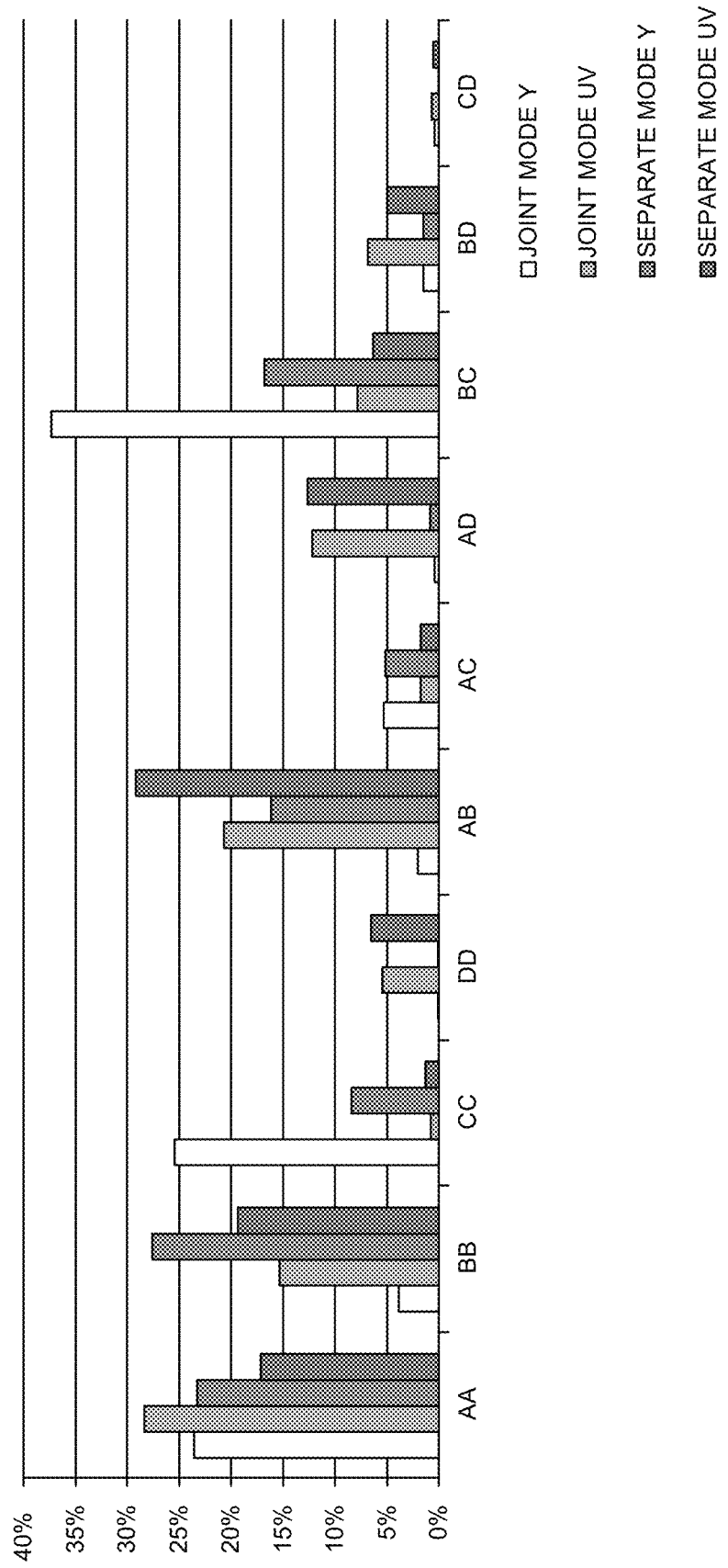
FIG. 6 illustrates a chart of distributions for combinations based on test results according to some embodiments.

FIG. 6 illustrates a chart of distributions for combinations based on test results according to some embodiments. As is shown, the combinations DD, AC, BD and CD are relatively rarely used compared to the other combinations. Therefore, it is possible, based on this information to eliminate those combinations to minimize the number of bits to signal which combination is used, if desired.

Figure 7:
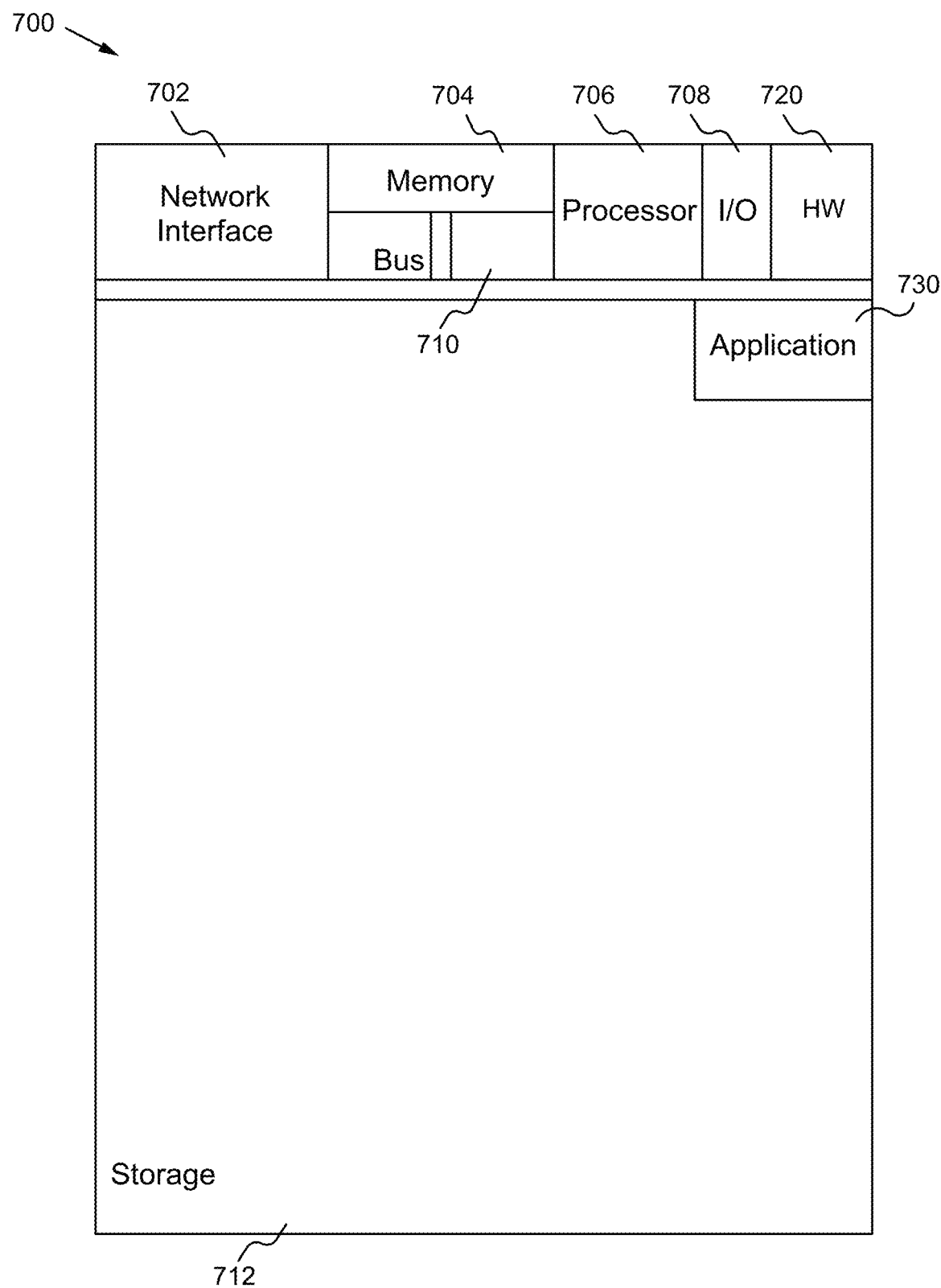
FIG. 7 illustrates a block diagram of an exemplary computing device configured to implement the sub-block entropy coding method according to some embodiments.

FIG. 7 illustrates a block diagram of an exemplary computing device configured to implement the sub-block entropy coding method according to some embodiments. The computing device 700 is able to be used to acquire, store, compute, process, communicate and/or display information such as images and videos. The computing device 700 is able to implement any of the sub-block entropy coding method aspects such as encoding and/or decoding. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of Local Area Network (LAN). The I/O device(s) 708 are able to include one or more of the following: keyboard, mouse, monitor, screen, printer, modem, touchscreen, button interface and other devices. Residual mapping application(s) 730 used to implement the sub-block entropy coding method are likely to be stored in the storage device 712 and memory 704 and processed as applications are typically processed. More or fewer components shown in FIG. 7 are able to be included in the computing device 700. In some embodiments, sub-block entropy coding hardware 720 is included. Although the computing device 700 in FIG. 7 includes applications 730 and hardware 720 for the sub-block entropy coding method, the sub-block entropy coding method is able to be implemented on a computing device in hardware, firmware, software or any combination thereof. For example, in some embodiments, the sub-block entropy coding applications 730 are programmed in a memory and executed using a processor. In another example, in some embodiments, the sub-block entropy coding hardware 720 is programmed hardware logic including gates specifically designed to implement the sub-block entropy coding method.

In some embodiments, the sub-block entropy coding application(s) 730 include several applications and/or modules. In some embodiments, modules include one or more sub-modules as well. In some embodiments, fewer or additional modules are able to be included.

In some embodiments, the sub-block entropy coding hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 8:
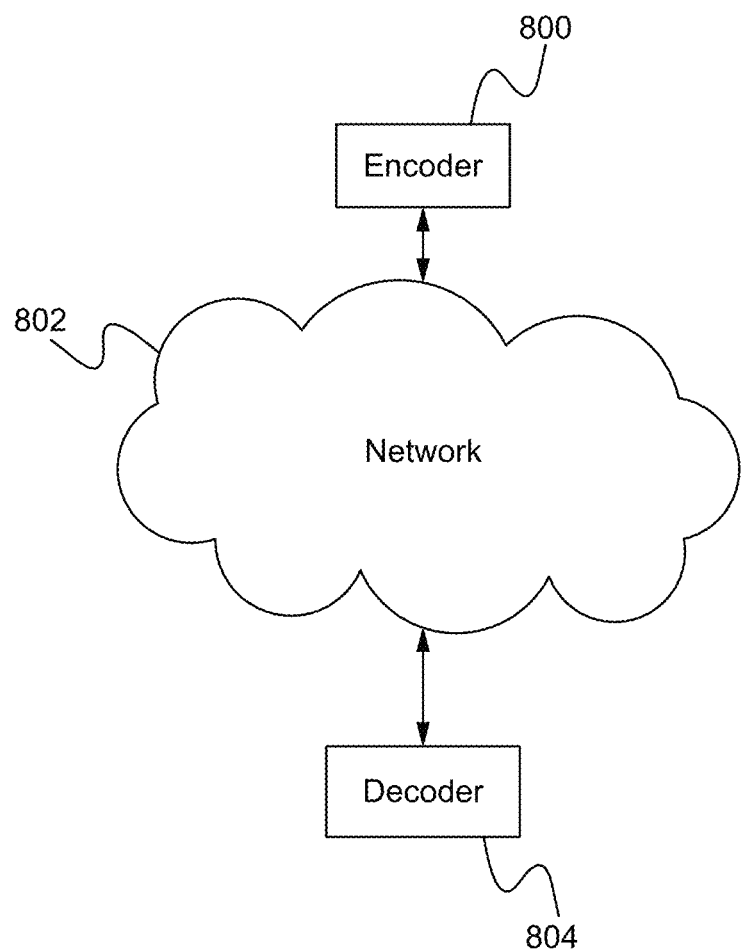
FIG. 8 illustrates a diagram of a network of devices according to some embodiments.

FIG. 8 illustrates a diagram of a network of devices according to some embodiments. Video content is encoded at one or more encoder devices 800. The encoded content is transmitted/streamed through a network 802 (e.g., the Internet, a cellular network or any other network) to one or more decoder devices 804. In some embodiments, the content is transmitted to the one or more decoder devices 804 directly without a network. The one or more devices of the network of devices (e.g., encoder device, decoder device) are configured to perform the sub-block entropy coding method described herein. The one or more encoder devices 800 and the one or more decoder devices 804 are able to be any device such as servers, a personal computers, smart phones, televisions, gaming systems, vehicles or any of the devices described herein or any combination of devices described herein.

To utilize the sub-block entropy coding method described herein, devices such as digital cameras/camcorders are used to acquire content. The sub-block entropy coding method is able to be implemented with user assistance or automatically without user involvement to efficiently encode, transmit, and decode content.

In operation, the sub-block entropy coding method more efficiently encodes content. Specifically, by selecting the most optimal tables for each sub-block, the number of bits utilizes is minimized. Furthermore, based on results, tables are able to be eliminated as options to further reduce the number of signaling bits.

Some Embodiments of Sub-Block Based Entropy Coding for Image Coding

1. A method programmed in a non-transitory memory of a device comprising:
    partitioning a block of an image into one or more sub-blocks;
    choosing at least one entropy coding table from a plurality of entropy coding tables; and
    utilizing the at least one entropy coding table to perform entropy coding.
2. The method of clause 1 further comprising selecting the plurality of entropy coding tables.
3. The method of clause 1 wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding.
4. The method of clause 3 wherein choosing the combination of two entropy coding tables includes signaling per block.
5. The method of clause 3 wherein when the entropy coding tables in the combination of two entropy coding tables are different, then a 1-bit signal per sub-block is used.
6. The method of clause 3 wherein the plurality of entropy coding tables is reduced by one or more entropy coding tables based on statistical analysis.
7. The method of clause 3 wherein choosing the at least one entropy coding table from the plurality of entropy coding tables is based on determining a minimum number of bits for coding the sub-block.
8. An apparatus comprising:
    a non-transitory memory for storing an application, the application for:
        partitioning a block of an image into one or more sub-blocks;
        choosing at least one entropy coding table from a plurality of entropy coding tables; and
        utilizing the at least one entropy coding table to perform entropy coding; and
    a processor coupled to the memory, the processor configured for processing the application.
9. The apparatus of clause 8 wherein the application is further for selecting the plurality of entropy coding tables.
10. The apparatus of clause 8 wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding.
11. The apparatus of clause 10 wherein choosing the combination of two entropy coding tables includes signaling per block.

12. The apparatus of clause 10 wherein when the entropy coding tables in the combination of two entropy coding tables are different, then a 1-bit signal per sub-block is used.

13. The apparatus of clause 10 wherein the plurality of entropy coding tables is reduced by one or more entropy coding tables based on statistical analysis.

14. The apparatus of clause 10 wherein choosing the at least one entropy coding table from the plurality of entropy coding tables is based on determining a minimum number of bits for coding the sub-block.

15. A system comprising:
a first computing device configured for:
partitioning a block of an image into one or more sub-blocks;
choosing at least one entropy coding table from a plurality of entropy coding tables; and
utilizing the at least one entropy coding table to perform entropy coding to encode content; and
a second computing device configured for:
decoding the encoded content.

16. The system of clause 15 wherein the first computing device is further for selecting the plurality of entropy coding tables.

17. The system of clause 15 wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding.

18. The system of clause 17 wherein choosing the combination of two entropy coding tables includes signaling per block.

19. The system of clause 17 wherein when the entropy coding tables in the combination of two entropy coding tables are different, then a 1-bit signal per sub-block is used.

20. The system of clause 17 wherein the plurality of entropy coding tables is reduced by one or more entropy coding tables based on statistical analysis.

21. The system of clause 17 wherein choosing the at least one entropy coding table from the plurality of entropy coding tables is based on determining a minimum number of bits for coding the sub-block.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
partitioning a block of an image into one or more sub-blocks;
choosing at least one entropy coding table from a plurality of entropy coding tables; and
utilizing the at least one entropy coding table to perform entropy coding, wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding, wherein when the entropy coding tables in the combination of two entropy coding tables are different, then a 1-bit signal per sub-block is used.

2. The method of claim 1 further comprising selecting the plurality of entropy coding tables.

3. The method of claim 1 wherein choosing the combination of two entropy coding tables includes signaling per block.

4. The method of claim 1 wherein the plurality of entropy coding tables is reduced by one or more entropy coding tables based on statistical analysis.

5. The method of claim 1 wherein choosing the at least one entropy coding table from the plurality of entropy coding tables is based on determining a minimum number of bits for coding the sub-block.

6. An apparatus comprising:
a non-transitory memory for storing an application, the application for:
partitioning a block of an image into one or more sub-blocks;
choosing at least one entropy coding table from a plurality of entropy coding tables; and
utilizing the at least one entropy coding table to perform entropy coding, wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding, wherein when the entropy coding tables in the combination of two entropy coding tables are different, then a 1-bit signal per sub-block is used; and
a processor coupled to the memory, the processor configured for processing the application.

7. The apparatus of claim 6 wherein the application is further for selecting the plurality of entropy coding tables.

8. The apparatus of claim 6 wherein choosing the combination of two entropy coding tables includes signaling per block.

9. The apparatus of claim 6 wherein the plurality of entropy coding tables is reduced by one or more entropy coding tables based on statistical analysis.

10. The apparatus of claim 6 wherein choosing the at least one entropy coding table from the plurality of entropy coding tables is based on determining a minimum number of bits for coding the sub-block.

11. A system comprising:
a first computing device configured for:
partitioning a block of an image into one or more sub-blocks;
choosing at least one entropy coding table from a plurality of entropy coding tables; and
utilizing the at least one entropy coding table to perform entropy coding to encode content, wherein choosing at least one entropy coding table from the plurality of entropy coding tables includes choosing a combination of two entropy coding tables, and utilizing the at least one entropy coding table to perform entropy coding includes utilizing the combination of the two entropy coding tables to perform entropy coding, wherein when the entropy coding tables in the combination of two entropy coding tables are different, then a 1-bit signal per sub-block is used; and a second computing device configured for:
  decoding the encoded content.

12. The system of claim 11 wherein the first computing device is further for selecting the plurality of entropy coding tables.

13. The system of claim 11 wherein choosing the combination of two entropy coding tables includes signaling per block.

14. The system of claim 11 wherein the plurality of entropy coding tables is reduced by one or more entropy coding tables based on statistical analysis.

15. The system of claim 11 wherein choosing the at least one entropy coding table from the plurality of entropy coding tables is based on determining a minimum number of bits for coding the sub-block.

* * * * *